(12) United States Patent
Silver et al.

(10) Patent No.: US 9,886,099 B2
(45) Date of Patent: Feb. 6, 2018

(54) ADAPTIVE INTERFACE DEVICE THAT IS PROGRAMMABLE AND A SYSTEM AND METHOD OF PROGRAMMING AN ADAPTIVE INTERFACE DEVICE

(71) Applicant: JoyLabz LLC, Santa Cruz, CA (US)

(72) Inventors: Jay Silver, Cocoa Beach, FL (US);
Seth Raphael, Redwood City, CA (US);
Yotam Mann, Brooklyn, NY (US)

(73) Assignee: JOYLABZ LLC, Santa Cruz, CA (US)

( * ) Notice: Subject to any disclaimer, the term of this patent is extended or adjusted under 35 U.S.C. 154(b) by 13 days.

(21) Appl. No.: 14/848,170

(22) Filed: Sep. 8, 2015

(65) Prior Publication Data

US 2016/0070362 A1    Mar. 10, 2016

Related U.S. Application Data

(60) Provisional application No. 62/047,618, filed on Sep. 8, 2014.

(51) Int. Cl.
*G06F 3/023* (2006.01)
*G06F 3/0482* (2013.01)
(Continued)

(52) U.S. Cl.
CPC ............ *G06F 3/0238* (2013.01); *A63F 13/22* (2014.09); *G06F 3/0219* (2013.01); *G06F 3/038* (2013.01)

(58) Field of Classification Search
CPC .... G06F 3/0238; G06F 3/0227; G06F 3/0219; G06F 3/038; G06F 3/0482; G06F 3/0484; A63F 13/22
See application file for complete search history.

(56) References Cited

U.S. PATENT DOCUMENTS

2003/0201982 A1\* 10/2003 Iesaka ................... G06F 1/1616
                                                                    345/168
2010/0265182 A1\* 10/2010 Ball ...................... G06F 3/0238
                                                                    345/168
(Continued)

FOREIGN PATENT DOCUMENTS

WO       2016/040375       3/2016

OTHER PUBLICATIONS

Silver et al., "Makey Makey: Improvising Tangible and Nature-Based User Interfaces," TEI, 2012 (4 pages).*

(Continued)

*Primary Examiner* — Amare Mengistu
*Assistant Examiner* — Jennifer Zubajlo
(74) *Attorney, Agent, or Firm* — Michael Best & Friedrich LLP

(57) ABSTRACT

An adaptive interface device that is programmable and a system and method of programming an adaptive interface device. To program the adaptive interface device, a user navigates navigable data structure stored on the adaptive interface device through certain combinations of user inputs using the programmable inputs. The adaptive interface device outputs navigation codes indicative of the user's navigation of the navigable data structure. A connected computer receives and interprets the navigation codes and provides visual feedback to a user to assist in programming. More particularly, a web browser of the connected computer receives the navigation codes and provides the user with a graphical representation of the navigable data structure and the user's navigation thereof.

20 Claims, 10 Drawing Sheets

(51) Int. Cl.
G06F 3/02 (2006.01)
G06F 3/0484 (2013.01)
G06F 3/038 (2013.01)
A63F 13/22 (2014.01)

(56) References Cited

U.S. PATENT DOCUMENTS

2010/0281268 A1 11/2010 Charlton et al.
2010/0309133 A1 12/2010 Hans-Werner et al.
2011/0304550 A1 12/2011 Maria et al.

OTHER PUBLICATIONS

Silver et al., "Makey Makey: Improvising Tangible Nature-Based User Interfaces," TEI, 2012 (4 pages).*
Jimb0, "MaKey MaKey Quickstart Guide (Part 2)," Sparkfun, dated Aug. 14, 2012 (https://web.archive.org/web/20131206100653/https://www.sparkfun.com/tutorials/388).
Jimb0. "MaKey MaKey Quickstart Guide." Sparkfun, published at least as early as Jun. 2015 (https://learn.sparkfun.com/tutorials/makey-makey-quickstart-guide).
International Search Report and Written Opinion for Application No. PCT/US2015/049020 dated Feb. 19, 2016 (11 pages).

* cited by examiner

ADAPTIVE INTERFACE DEVICE THAT IS PROGRAMMABLE AND A SYSTEM AND METHOD OF PROGRAMMING AN ADAPTIVE INTERFACE DEVICE

RELATED APPLICATIONS

The application claims priority to U.S. Provisional Patent Application No. 62/047,618, filed Sep. 8, 2014, the entire contents of which are incorporated herein by reference.

FIELD OF THE INVENTION

The present invention relates to adaptive interface devices.

BACKGROUND

Personal computing devices, including, for example, desktop computers, laptop computers, tablets, smart phones, and personal digital assistants, typically include or can be coupled to various interface devices, such as a keyboard, mouse, and gaming controller. Generally, some external input (e.g., a human touch or movement) causes the interface device to output predetermined data or control signals to the computing device. The data or control signals are then received by software executing on the computing device, which cause the computing device to react in a manner in accordance with the software.

Some interface devices are adaptive and may be configured by a user to alter the particular outputs generated in response to particular inputs on the interface device. Nevertheless, configuring an adaptive interface device may require specialized software executing on the computing device and bi-directional communication with the adaptive interface device to enable the computing device to overwrite data on the adaptive interface device.

Accordingly, there is a need for improved systems and methods for programming of interface devices.

SUMMARY

In one embodiment, the invention provides a method of programming an adaptive interface device. The method includes providing a remapping graphical user interface on a display screen of a computing device and providing, on the remapping graphical user interface, a graphical representation of a navigable data structure of the adaptive interface device. The adaptive interface device receives navigation codes indicative of navigation inputs. The graphical representation is updated based on the navigation codes. The method includes determining based on the navigation codes that the adaptive interface device has been remapped to have an updated mapping. The updated mapping of the adaptive interface device is displayed on the remapping graphical user interface.

In some instances, the computing device receives a data cable coupled to the adaptive interface device, wherein the navigation codes are received over the data cable. In some instances, the method includes receiving a remap mode message from the adaptive interface device, where the remap mode message indicating that the adaptive interface device has entered a remap mode. In some instance, the method includes receiving current mapping data from the adaptive interface device and displaying, on the remapping graphical user interface, a current mapping of the adaptive interface device based on the current mapping data. In some instances, the method includes displaying, on the remapping graphical user interface, a virtual adaptive interface device including programmable inputs of the adaptive interface device. In some instances, displaying the updated mapping of the adaptive interface device includes displaying the updated mapping on the virtual adaptive interface device. In some instances, the graphical representation of the navigable data structure is a virtual keyboard.

In another embodiment, the invention provides another method of programming an adaptive interface device. The method includes transmitting, by the adaptive interface device, a remap mode message to a computing device. The remap mode message indicates that the adaptive interface device has entered a remap mode. The adaptive interface device receives navigation input that navigates a navigable data structure of the adaptive interface device used to remap programmable inputs of the adaptive interface device. The adaptive interface device remaps the programmable inputs based on the navigation input. The method further includes transmitting, by the adaptive interface device, navigation codes indicative of the navigation input received and indicative of the remapping.

In some instances, the adaptive interface device receives a data cable coupled to the computing device, wherein the navigation codes are transmitted over the data cable. In some instances, the method includes, upon entering the remap mode, transmitting current mapping data to the computing device, where the current mapping data is indicative of a current mapping of the programmable inputs of the adaptive interface device. In some instances, the method includes receiving a request, via the programmable inputs, to enter the adaptive interface device into a remap mode. In some instances, the method includes receiving user input at a first programmable input of the programmable inputs before receiving the request to enter the remap mode. These instances may further include transmitting, by the adaptive interface device, a first code to the computing device representing a first mapped output in response to the user input; receiving further user input at the first programmable input after the remapping; and transmitting, by the adaptive interface device, a second code to the computing device representing a second mapped output in response to the further user input.

In another embodiment the invention provides a programmable adaptive interface device. The programmable adaptive interface device includes programmable inputs, an input/output interface, a memory, and a processor. The input/output interface is configured to be coupled to a computing device. The memory includes a navigable data structure and a key mapping index. The processor is configured to transmit a remap mode message via the input/output interface to the computing device, where the remap mode message indicates that the adaptive interface device has entered a remap mode. The processor is further configured to receive, via the programmable inputs, navigation input that navigates the navigable data structure. The processor remaps the programmable inputs based on the navigation input and transmits, via the input/output interface to the computing device, navigation codes. The navigation codes are indicative of the navigation input received and indicative of the remapping.

In some instances, the programmable adaptive interface device includes a data cable coupled to the input/output interface and the computing device to form a communication link. In some instances, the key mapping index relates each of the programmable inputs to a corresponding output code. In some instances, upon entering the remap mode, the key mapping index has current mapping data indicative of a current mapping of the programmable inputs of the adaptive interface device. In some instances, upon completion of the remapping, the key mapping index has updated mapping data indicative of an updated mapping of the programmable inputs of the adaptive interface device. In some instances, the processor is further configured to, receive user input at a first programmable input of the programmable inputs; transmit a first code to the computing device representing a first mapped output in response to the user input; receive further user input via the first programmable input after the remapping; and transmit a second code to the computing device representing a second mapped output in response to the further user input. In some instances, the device further includes a conductor selectively secured to two of the programmable inputs to form a conductive path between the two programmable inputs. The processor is further configured to detect the conducted path formed by the conductor and, in response, enter the adaptive interface device into the remap mode.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
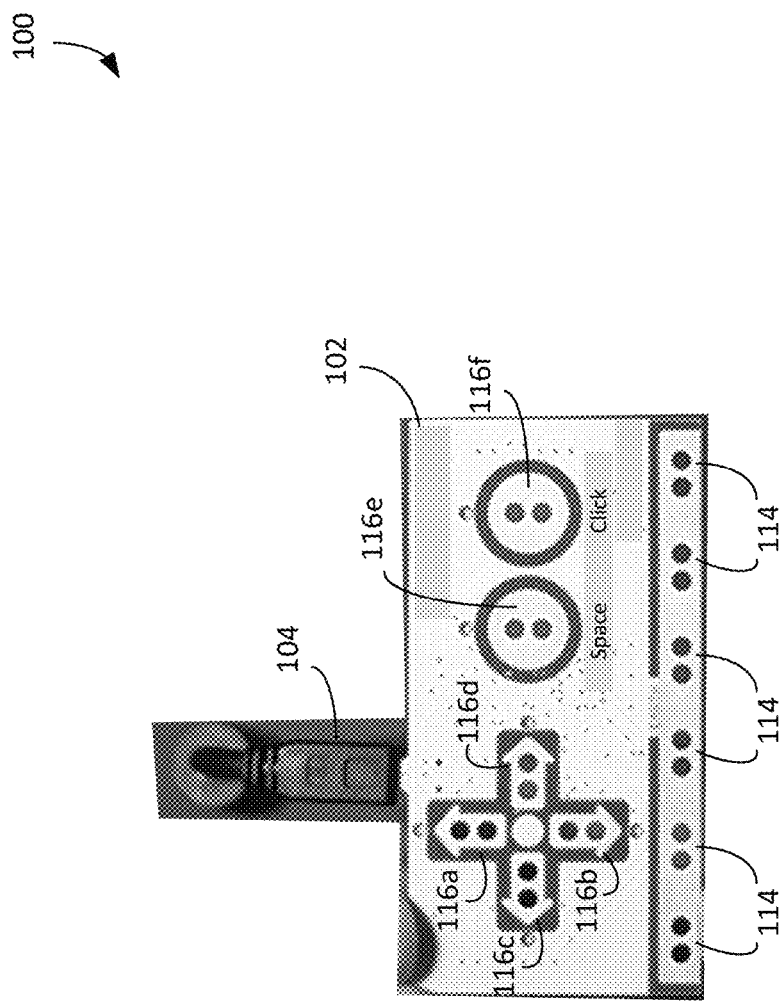
FIG. 1A illustrates a front side of an adaptive interface device in accordance with some embodiments of the invention.
Figure 1B:
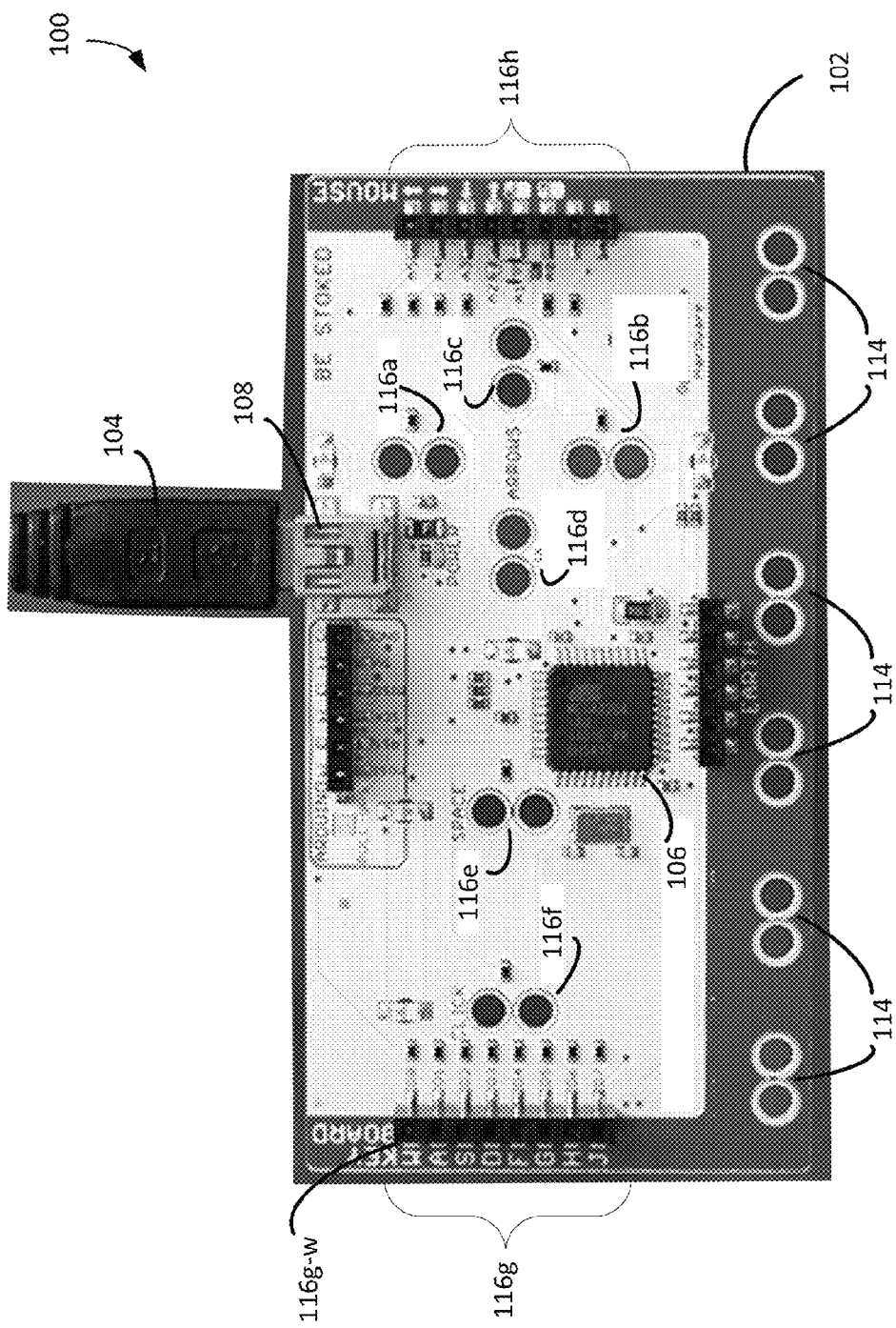
FIG. 1B illustrates a back side of the adaptive interface device of FIG. 1A.

FIGS. 1A and 1B illustrate a front and back view, respectively, of an adaptive interface device 100 in accordance with some embodiments. The adaptive interface device 100 is a programmable device that simulates a computer peripheral device, such as a keyboard or mouse, based on user inputs. The user inputs include, for instance, actions that result in completing a conductive circuit loop. The user inputs are detected by the adaptive interface device 100, which, in turn, generates outputs that simulate peripheral device outputs.

The adaptive interface device 100 includes a printed circuit board (PCB) 102 and a connector cable 104 (e.g., a universal serial bus (USB®) cable). The PCB 102 includes a microcontroller 106 executing firmware stored on a local memory of the microcontroller 106 or another memory of the PCB 102. The PCB 102 includes a port 108 that receives the connector cable 104.

Figure 3:
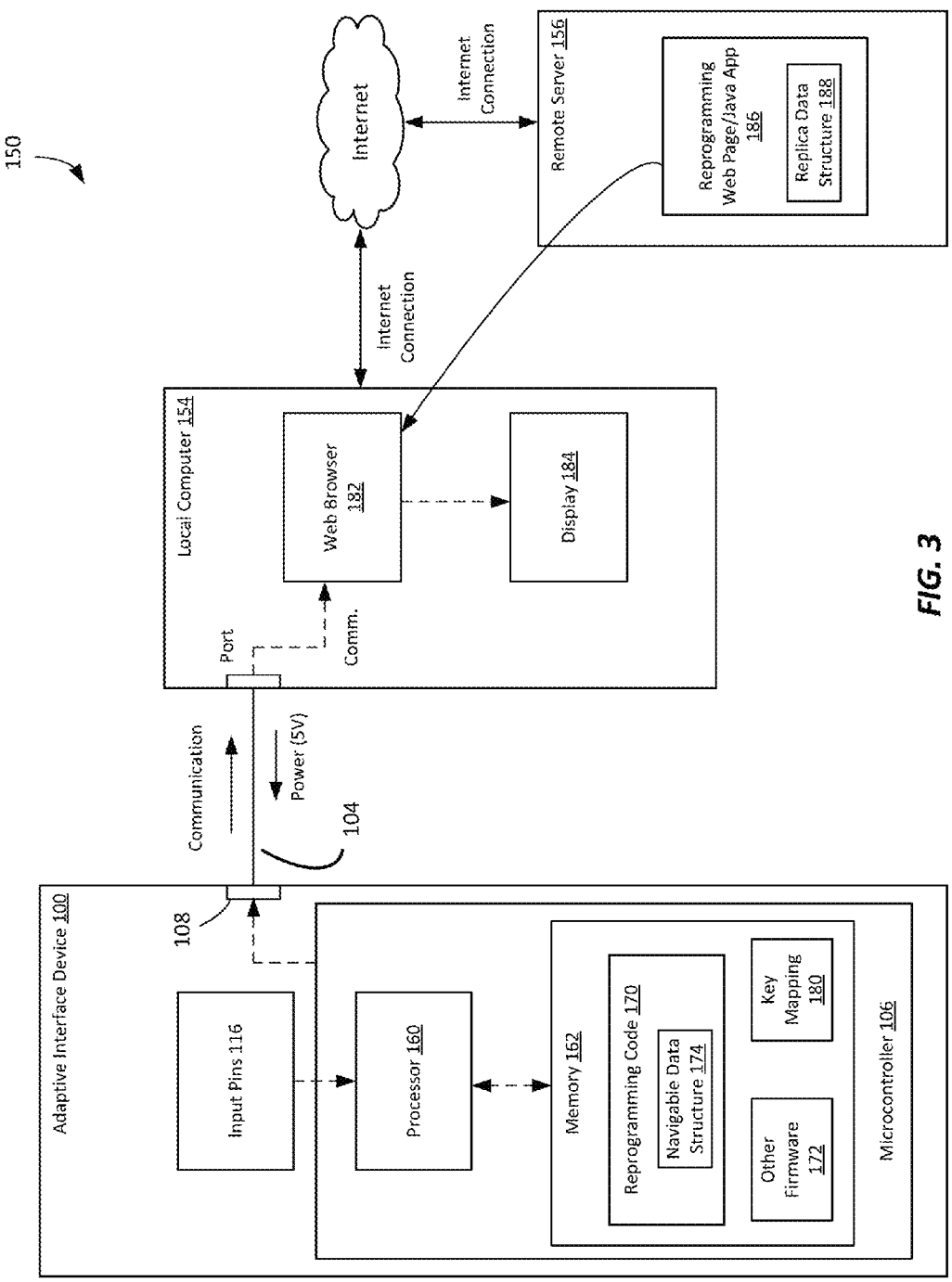
FIG. 3 illustrates a diagram of a reprogramming system including the adaptive interface device of FIG. 1A.

With reference to FIG. 3, the opposite end of the connector cable 104 is coupled to a peripheral port 110 of a computer 112 (e.g., a desktop computer, a laptop, or tablet). The connector cable 104, port 108, and peripheral port 110 may be, for example, one of a USB®, Firewire®, or Thunderbolt® port. The PCB 102 receives power (e.g., 5 volts direct current (DC)) from the computer 112 via the connector cable 104, which powers components of the PCB 102 including the microcontroller 106. The PCB 102 uses the Human Interface Device (HID) protocol to communicate with the computer 112 over the connector cable 104. The communications signal to the computer 112, for example, particular keyboard (key) presses, mouse clicks, and mouse movements. In some embodiments, in place of or in addition to the connector cable 104, a wireless connection, such as a Bluetooth® or Wi-Fi®, is used for communications between the PCB and the computer. In these wireless implementations or implementations where a wired connection does not provide power, a portable power supply (e.g., a battery) may be coupled to the PCB 102 to provide power.

Returning to FIGS. 1A and 1B, the PCB 102 includes several input pins that are coupled to the microcontroller 106 (e.g., via traces on the PCB). The PCB 102 includes six earth/ground pins 114 provided along the bottom. Additionally, the PCB 102 includes a plurality of input pins, referred to generally as input pins 116, but more particularly identified herein with a letter appended to the identifier 116 (e.g., up arrow pin 116a). The front of the PCB 102 includes six input pins 116: the up arrow pin 116a, down arrow pin 116b, left arrow pin 116c, right arrow pin 116d, space pin 116e, and click pin 116f, collectively referred to as input pins 116. Each ground pin 114 and input pin 116 includes two conductive apertures, which enable quick connections of alligator clip cables because each half of the alligator clip is received by a respective aperture, and the (spring-loaded) alligator clip clamps onto the bridge portion of the PCB dividing the two apertures. Of course, conductors without alligator clips may be coupled to the input pins as well, such as via soldering and other techniques.

The back of the PCB 102 (FIG. 1B) has several additional input pins for additional keyboard keys and mouse controls. As illustrated, the back of the PCB 102 includes eight additional keyboard inputs 116g for keyboard keys, which are individually labeled W, A, S, D, F, G, H, and J, and six additional input mouse pins 116h for mouse controls, which are graphically labeled with a mouse up, mouse down, mouse left, mouse right, right click, and left click graphic. The keyboard input pins 116g and mouse input pins 116h are female headers that may receive paper clip ends, wire ends, jumper ends, or other conductors. The back of the PCB 102 also includes an area for using the board to control outputs. Furthermore, as shown in FIGS. 1A and 1B, because the input pins 116 on the front side of the PCB 102 include apertures that extend through the PCB 102, these input pins 116 are also accessible for alligator clip connections from the back side of the PCB 102.

The particular pin layout and number of pins on the PCB 102 are exemplary. In some embodiments, the input pins 116 are located on other portions of the PCB 102 and/or in other layout arrangements. In some embodiments, the PCB 102 includes more or fewer input pins 116 on the front, back, or both.

Each of the input pins 116 noted above includes a default pin assignment such that each input pin 116 is mapped to particular key board press (e.g., a "w"), mouse control (e.g., a right mouse click), or other HID protocol signal. Labels, graphics, and the layout of the PCB 102 make the default pin assignment apparent to a user. For instance, the up arrow input pin 116a is positioned within an up arrow illustration and space input pin 116e includes the text "space" beneath it (see FIG. 1A). In some embodiments, different default key presses and mouse controls are assigned to the inputs pins 116. Furthermore, as discussed in detail below, the assignments to the input pins 116 may be reprogrammed such that they map to and simulate different key presses, mouse controls, or other HID protocol signals.

Figure 2:
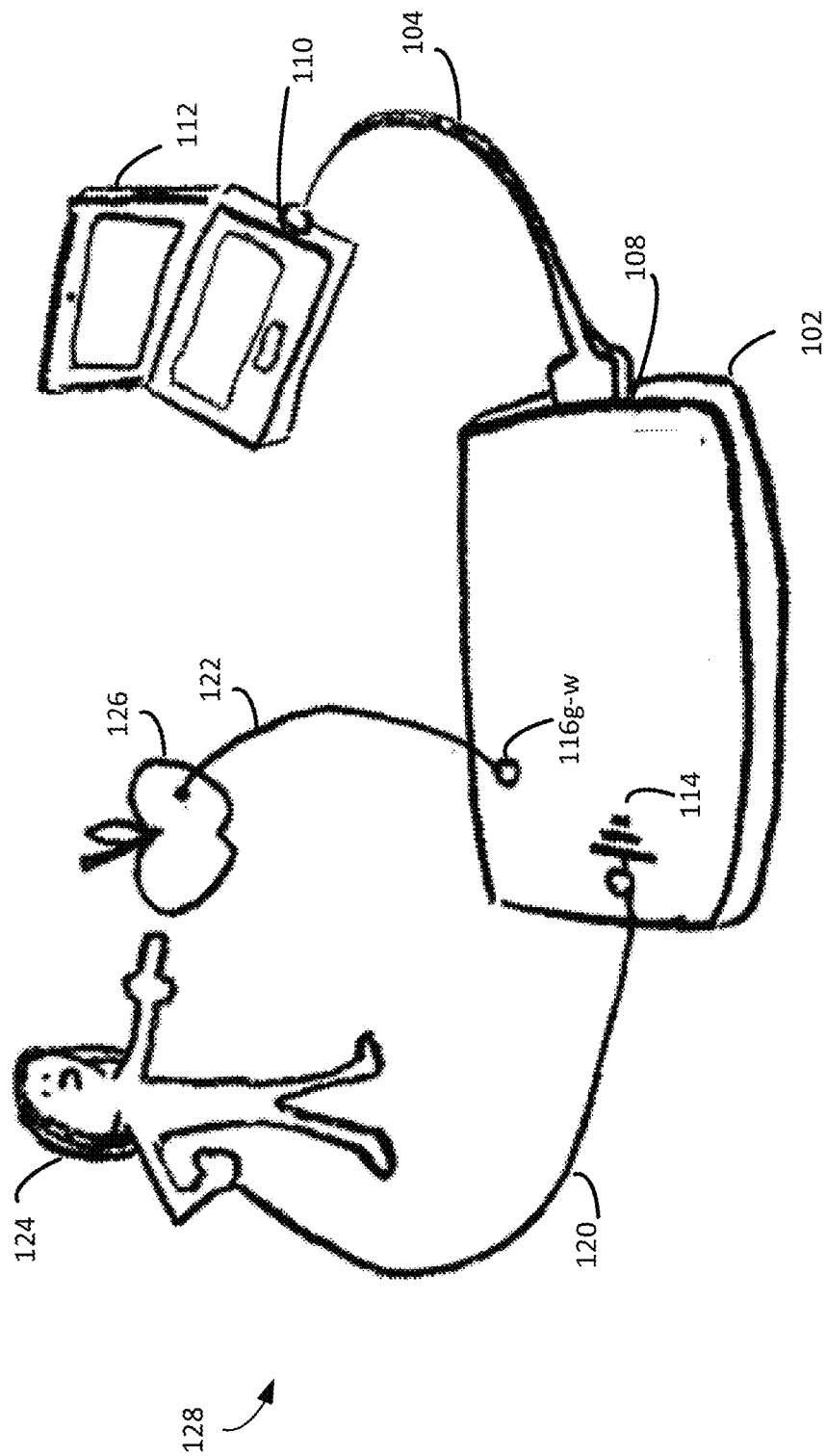
FIG. 2 illustrates a diagram of the adaptive interface device of FIG. 1A operating as an interface device for a computing device.

Referring back to FIG. 2, a ground conductor 120 and an input conductor 122 are coupled to the ground pin 114 and one of the keyboard input pins 116g, respectively. The keyboard input pin of FIG. 2 is labeled 116g-w, and represents the keyboard input pin 116g having a default pin assignment of the letter "w" (see uppermost input pin 116 in FIG. 1B). As an example, the ground conductor 120 and input conductor 122 are alligator clip cables, which are wires having alligator clips on one or both ends. An insulating wrap may be positioned around the wire, except for the ends that are exposed for conductive coupling. The ground conductor 120 and input conductor 122 are coupled at one end to the group pin 114 and keyboard input pin 116g-w, respectively, and, at the opposite end, to a person 124 and an apple 126, respectively. Although removable in some embodiments, like the connector cable 104, the ground conductor 120 and the input conductor 122 may be considered to be part of the adaptive interface device 100.

When the person 124 touches the apple 126 (e.g., with a finger), a completed circuit loop 128 forms between the keyboard input pin 116g-w and the ground pin 116. The loop 128 includes the keyboard input pin 116g-w, the input conductor 122, the apple 126, the person 124, the ground conductor 120, and the ground pin 114. The completed circuit loop 128 is detected by the microcontroller 106 of the PCB 102. Completing a circuit loop of one of the input pins 116, which is then detected by the PCB 102, is an example of triggering the input pin 116. In response, the PCB 102 sends the computer 112 an HID signal associated with the keyboard input pin 116g-w. That is, the PCB 102 generates an output that simulates a keyboard or mouse action (e.g., key press, mouse click, or mouse movement).

The computer 112 reacts to receiving the output from the PCB 102 as if the output were sent from a standard keyboard or mouse. Therefore, a user, such as the person 124 in the above-illustrated figure, can simulate a key stroke on a keyboard by touching the apple 126, and the computer 112 will receive the simulated key stroke and react as if the user had pressed the actual key on the key board that is being simulated. For instance, in a word processing program, and where the key stroke simulated is the letter "w," upon the user touching the apple 126, the word processing program would react as if a user pressed the "w" on the keyboard and display a new "w" on a display of the computer 112.

The microcontroller 106 monitors the input pins 116 and uses high resistance switching and filtering to provide a sensitive detector that senses a completed circuit loop even through materials like skin, leaves, and modeling compound, which are not highly conductive. For example, the PCB 102 uses a pull-up resistor of twenty-two (22) mega ohms. Software executing on the microcontroller 106 filters noise on each input pin 116 using a moving window averager to lowpass filter. Alternatively, although potentially increasing costs, the adaptive interface device could use hardware filtering.

Although the apple 126 is illustrated above, any material that can conduct electricity, even if only slightly, will work to complete a circuit loop and be detected by the adaptive interface device 100. Other examples of conductive items used to complete a circuit loop between one of the input pins 116 and the ground pins 114 of the PCB 102 include ketchup, pencil graphite, finger paint, lemons, plants, coins, other humans, silverware, water (and wet objects), most foods, cats, dogs, aluminum foil, rain, and many others.

Furthermore, if the person 124 is grounded, the input pins 116 are touch-sensitive. In other words, rather than the person 124 touching the apple 126 to trigger the input 116g-w, the user may directly touch the input pin 116g-w to complete the circuit loop.

Although described with respect to a word processing application, the adaptive interface device 100 similarly works with other programs and webpages that take keyboard input, mouse input, and other HID input. In another example, the adaptive interface device 100 is used with a computer program executing on the computer 112 that generates a virtual piano. In typical operation, the virtual piano is played using key presses on a keyboard and/or mouse actions. Instead of using the computer keyboard buttons to play the virtual piano, the adaptive interface device 100 generates outputs that are used to play the virtual piano. Select ones of the input pins 116 can be connected to bananas via input conductors (similar to the input conductor 122), the user to ground via a ground conductor (similar to ground conductor 120), and the bananas become the piano keys. That is, each time a grounded user touches one of the bananas, a circuit loop is completed between the ground pin 114 and one of the input pins 116, which is detected by the adaptive interface device 100. In turn, the adaptive interface device 100 generates an output to the computer 112 that simulates a key press or mouse action, the particular key press or mouse action depending on the particular one of the input pins 116 that is triggered. The output is received by the computer program executing on the computer 112, resulting in playing a key or keys of the virtual piano.

As noted above, the adaptive interface device 100 is reprogrammable so that the pin assignments of the input pins 116 can be changed. In other words, the adaptive interface device 100 can be reprogrammed to change the output signal that is transmitted over the connector cable 104 in response to a particular one of the input pins 116 being triggered. For instance, in the example described with respect to FIG. 2, triggering the input pin 114g-w causes a "W" HID code to be transmitted to the computer 112. However, after reprogramming, the adaptive interface device 100 may be configured so that further triggering of the input pin 114g-w causes an "X" HID code to be transmitted instead of the "W" HDI code.

In some embodiments, the reprogramming, also referred to as remapping, is carried out without having to connect the adaptive interface device 100 to a computer having special drivers or specific software installed thereon. Moreover, the reprogramming is carried out without communicating firmware or other updates from a computer to the adaptive interface device 100. Rather, user inputs on the input pins 116 of the adaptive interface device 100 itself cause reprogramming of the adaptive interface device 100.

FIG. 3 illustrates a block diagram of reprogramming system 150 including the adaptive interface device 100, a local computer 154, and a remote server 156. The local computer 154 is a computing device and may be, for example, a laptop, tablet, or desktop computer, such as the computer 112 shown in FIG. 2. The adaptive interface device 100 includes a processor 160, a memory 162, the input pins 116 (also referred to as programmable inputs), and the port 108. The processor 160 and memory 162 form part of the microcontroller 106 (shown in FIG. 1B) and the programmable inputs include the input pins 116 (shown in FIGS. 1A and 1B).

In some embodiments, the memory 162 includes instructions executed by the processor 160, as well as data used by the processor 160, to carry out the functionality of the adaptive interface device 100 described herein. The instructions include reprogramming code 170 executed by the processor 160 in a remapping mode, as well as other firmware 172, which includes at least code for a normal operation mode of the adaptive interface device. The reprogramming code 170 defines navigable data structure 174 that are navigable by the user during reprogramming and controls the reprogramming of the input pins 116 in accordance with the user's navigation.

In some embodiments, the memory 162 further includes a key mapping 180, which defines the correlation between (a) the input pins 116 of the adaptive interface device 152 that can be triggered by a user and (b) the correlating output codes that the adaptive interface device 152 is to generate in response to being triggered. For example, upon receipt by the processor 160 of a user input in response to actuation of one of the input pins 116, the processor 160 may access the memory 162 and use an identifier of the actuated input pin 116 as an index into a data table of the key mapping 180. The data table, also referred to as a key mapping index, associates the identifier with an HID output code, which is provided back to the processor 160. The processor 160 then outputs the returned HID output code on the port 108. The key mapping 180 may include a current key mapping defining the current input pin-to-output code assignments, as well as a default key mapping that may be used to overwrite the current key mapping upon a reset or restore operation of the adaptive interface device 100. In this example, to reprogram the adaptive interface device 100, at least a portion of the key mapping 180 is overwritten or otherwise updated to change the stored input pin-to-output code assignments. In other words, some or all of the input pins 116 are remapped to different output codes.

In some embodiments, the local computer 154 is coupled to the remote server 156 via the Internet, which may include one or more wired and/or wireless connections. Although not illustrated, the local computer 154 and remote server 156 each include a processor and memory. The local computer 154 includes a web browser software application (web browser) 182 executed by the processor (not shown), a user interface including a display 184, and other user inputs (not shown), such as a keyboard and mouse, for interacting with the web browser 182. The user is operable to enter an address into or otherwise navigate the web browser 182 to a web site for adaptive interface device reprogramming on the remote server 156, which causes the remote server to transmit web pages including java application software (web page software) 186 to the web browser 182. The web browser 182 interprets and/or executes the web page software 186, and provides corresponding visual output to the display 184, which, as discussed in further detail below, assists in reprogramming the adaptive interface device 100. In some embodiments, the local computer 154 and remote server 156 are coupled by a network connection not including the Internet, such as a local network or intranet connection. Additionally, in some embodiments, the web page software 186 is stored on the local computer 154 so that an Internet connection (or other connection) to the remote server 156 is not used during reprogramming of the adaptive interface device.

To reprogram, a user navigates the navigable data structure 174 within the microcontroller 106 of the adaptive interface device 100 through certain specified combinations of user inputs using the input pins 116. The adaptive interface device 100 as illustrated in FIGS. 1A and 1B does not itself have a display or simple means to provide visual feedback of a user's reprogramming of the adaptive interface device. However, as described above, the adaptive interface device 100 is able to output signals to the computer 154 to provide visual and/or audible feedback to a user to assist in programming. More particularly, as a user navigates the navigable data structure 174 to reprogram the adaptive interface device 100, the processor 160 outputs signals representing the navigation inputs received via the input pins 116 and generates outputs representing the navigation inputs over the connector cable 104. While reprogramming, the web page software 186 is executing on the web browser 182 of the coupled local computer 154, which is operable to receive the outputs from the adaptive interface device 100 and provide the user with a graphical representation on the display 184 of the navigable data structure 174 used to reprogram that the user is navigating.

To provide the graphical representation, the web browser 182 executing on the local computer 154 includes a corresponding copy of the navigable data structure 174 received from the web page software 186, referred to as a replica data structure 188. The web page software 186 may include several replica data structures 188, one for each type of adaptive interface device 100. The web browser 182 receives the outputs from the adaptive interface device 100 and navigates the replica data structure 188 accordingly, providing real-time visual feedback of the user's navigation. This browser-based graphical user interface provides the user otherwise unavailable visual feedback and allows the user to more easily navigate an otherwise complex array of data structures within the adaptive interface device 100.

The communication between the adaptive interface device 100 and local computer 154 is one-way, from the adaptive interface device 100 to the local computer 154, i.e., to the web browser 182. As the communication is one-way, the local computer 154 does not communicate back to the adaptive interface device 100, at least not substantively. In some instances, certain acknowledgement and handshaking communications are sent from the local computer 154 to the adaptive interface device 100 to establish or maintain a communication link according to certain communication protocols. In these instances, the communication between the computer 154 and the adaptive interface device may still be considered one-way because substantive data payloads are not passed from the local computer 154 to the adaptive interface device 100. In other words, one-way communication means that substantive data payloads are transmitted via a communication link in only one direction (e.g., from device A to B, and not from device B to A), rather than in two directions (e.g., from device A to B, and also from device B to A). As an example, programming data and commands that update the key mapping 180 (e.g., particular pin assignment values, save commands, and restore commands) are not provided from the local computer 154. Rather, the programming data and commands are generated from within the adaptive interface device 100 by the reprogramming code 170 in response to navigation input received by the input pins 116. Here, the programming data and commands are examples of substantive data payloads, while mere acknowledgement and handshaking communications to establish or maintain a communication link according to certain communication protocols are nonsubstantive.

During reprogramming, the web browser 182 is an application on the local computer 154 that is in the foreground to ensure that it receives the communication from the adaptive interface device 100. If the user navigates to another application or webpage, causing the web browser 182 to be in the background, and then the user triggers one of the input pins 116 of the adaptive interface device 100, the web browser 182 may not receive the user input. Therefore, synchronization between the actual navigation of the navigable data structure 174 on the adaptive interface device 100 and the replica data structure 188 on the web browser 182 may be lost. Thus, visual feedback of the user's actual navigation on the adaptive interface device 100 from that point forward may be inaccurate.

In alternate instances, a user couples a five volt (5 volt) DC power supply to the PCB 102, rather than connecting it to the local computer 154 via the connector cable 104, and programs the adaptive interface device 100 without visual feedback from the local computer 154. Additionally, the adaptive interface device 100 is but an example of the interface devices that may be programmed as described herein. Other interface devices may use include other techniques for receiving user inputs and triggering inputs that result in outputs of the interface device. Such other techniques may include one or more of pushbuttons, keypads, optical sensors, and capacitive sensors interfacing with a microcontroller.

Figures 4A, 4B:
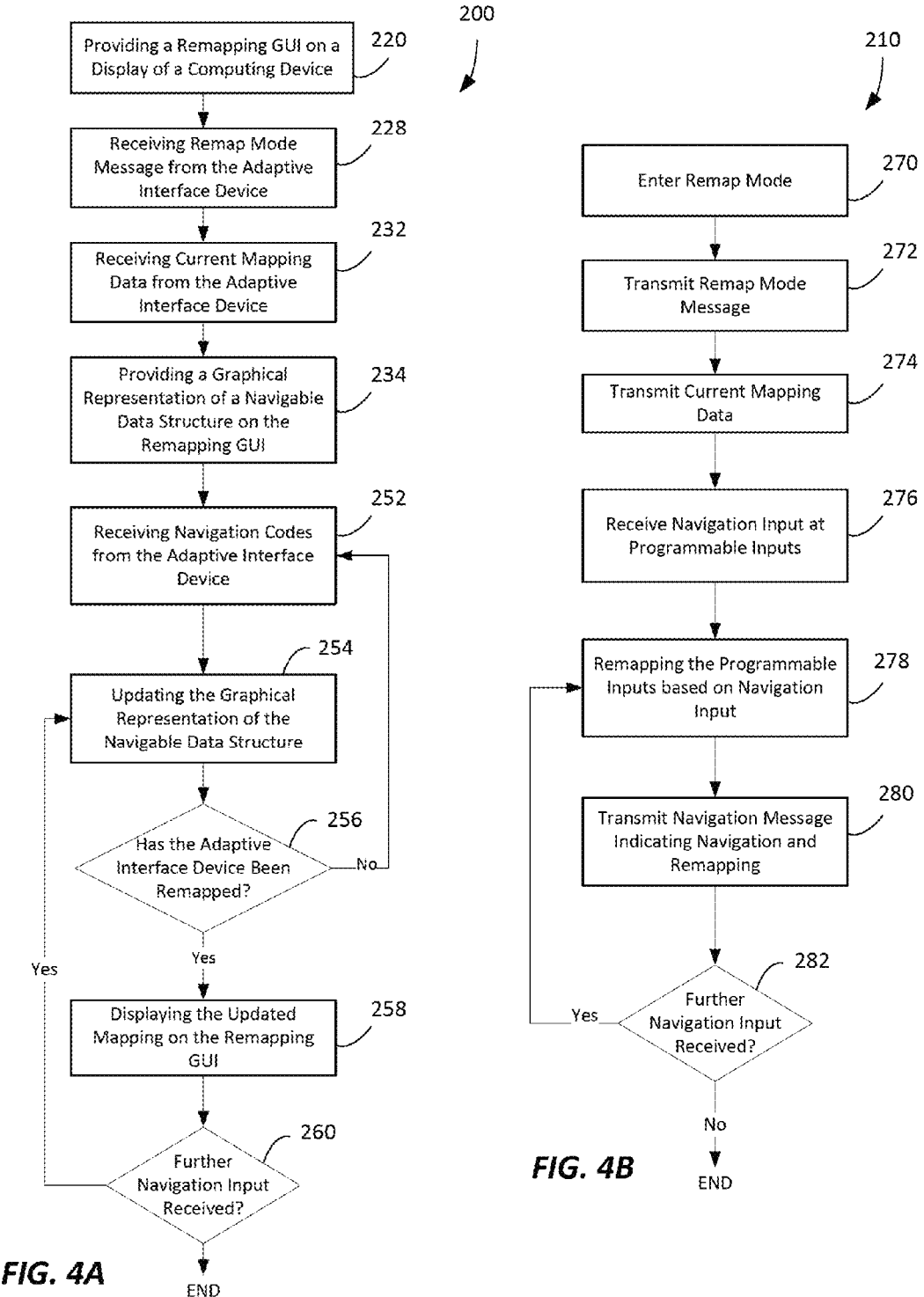
FIGS. 4A and 4B illustrate methods for programming an adaptive interface device, such as the adaptive interface device of FIG. 1A.

FIGS. 4A and 4B illustrate methods 200 and 210, respectively, for programming an adaptive interface device. The methods 200 and 210 are described with respect to reprogramming the adaptive interface device 100; however, in some embodiments, the methods are used to reprogram other interface devices. The method 200 is generally described from the perspective of a computing device that is coupled to an adaptive interface device being reprogrammed, while method 210 is generally described from the perspective of an adaptive interface device being reprogrammed. Together, the methods 200 and 210 may be carried out by components of a reprogramming system, such as reprogramming system 150, to reprogram an adaptive interface device.

In step 220 of the method 200 of FIG. 4A, a remapping graphical user interface (remapping GUI) 221 is provided on the display 184 of the local computer 154. The remapping GUI 221 may be provided by the web browser 182 based on the web page software 186 obtained from the remote server 156, as described above, or based on a local software application residing on the local computer 154. The remapping GUI 221 includes various screens to convey information to a user, examples of which are shown and described with respect to FIGS. 5A-5E.

For instance, in step 220, a user starts the web browser 182 on the local computer 154, which is connected to the Internet, and navigates to the reprogramming web page having the web page software 186. The web browser 182, in turn, displays a remapping start screen 222 illustrated in FIG. 5A. As shown below, this screen 222 instructs the user to disconnect their adaptive interface device 100 and to then initiate the process by clicking a start button 224 (e.g., using a mouse coupled to the local computer 154). This clicking action ensures that the web browser 182 is in the foreground on the local computer 154 and will be receiving data from the adaptive interface device 100 in later stages.

Figure 5A:
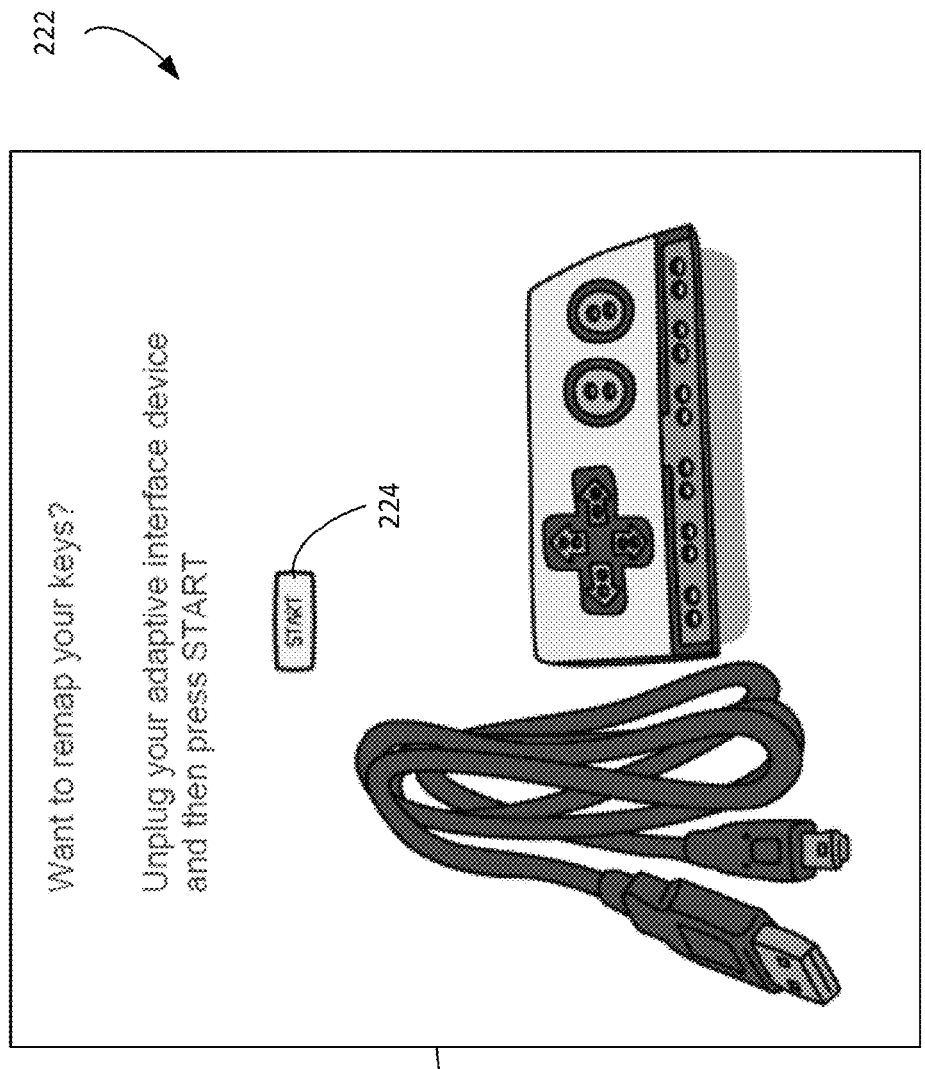
FIGS. 5A, 5B, 5C, 5D, and 5E illustrate various screens of a remapping graphical user interface in accordance with some embodiments of the invention.
Figure 5B:
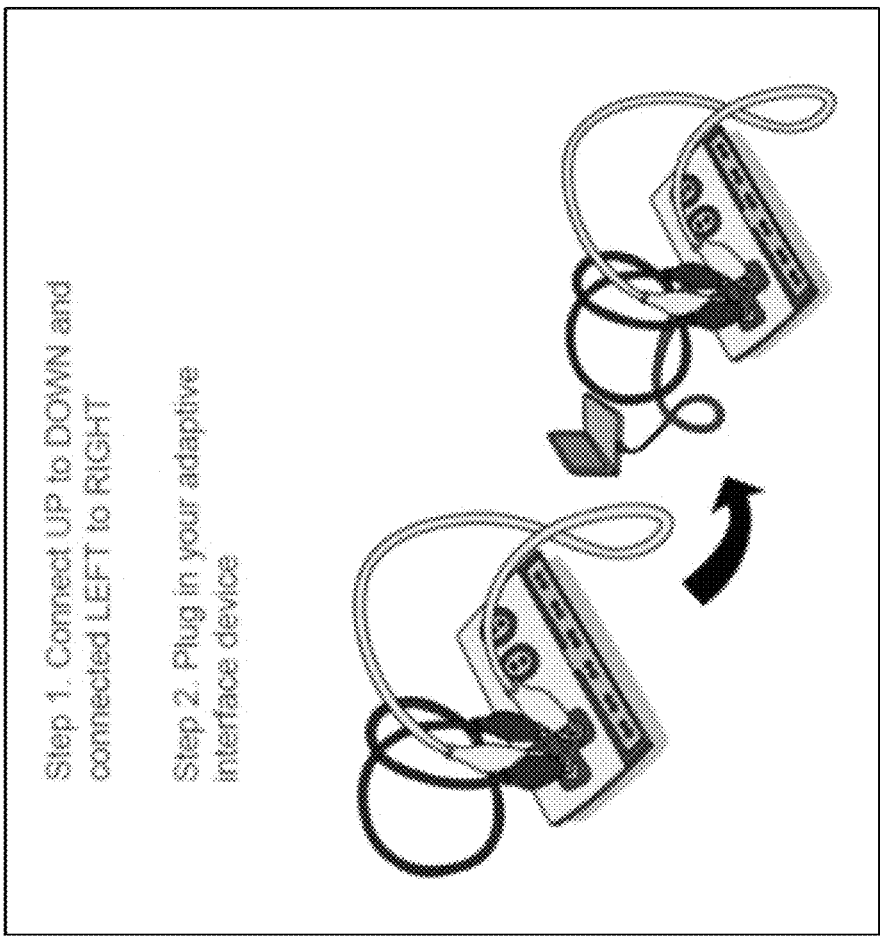

Upon selecting the start button 224, the remapping GUI 221 is updated to display the enter remap mode screen 226 (FIG. 5B). The screen 226 instructs the user how to boot the adaptive interface device 100 in the remap mode. In the example instructions on the screen 226, the user is instructed to connect the input pin 116a and 116b (e.g., with a first alligator clip cable), to connect the input pin 116c and 116d (e.g., with a second alligator clip cable), and then to connect the adaptive interface device 100 to the computer 154 using the connector cable 104. When the adaptive interface device 100 is booted in the remap mode, light emitting diodes (LEDs) of the PCB 102 will slowly pulse on and off to indicate to the user that the boot was successful and that the adaptive interface device 100 is in the remap mode, not in the normal operating mode.

After the user has followed the instructions set out in the screen 226, the local computer 154 receives a remap mode message from the adaptive interface device 100 (step 228). For example, the adaptive interface device 100 outputs a confirmation string upon entering the remap mode, the string including a name of the adaptive interface device 100, the software version, and the hardware version (e.g., "mm v1.20ab"). The web browser 182 can determine from the confirmation string the software and hardware version of the coupled adaptive interface device 100. Accordingly, when the adaptive interface device 100 is revised or an alternate version is coupled that may have different layouts, inputs, and capabilities, the web browser 182 can proceed appropriately (e.g., obtain the appropriate replica data structure 188).

Figure 5C:
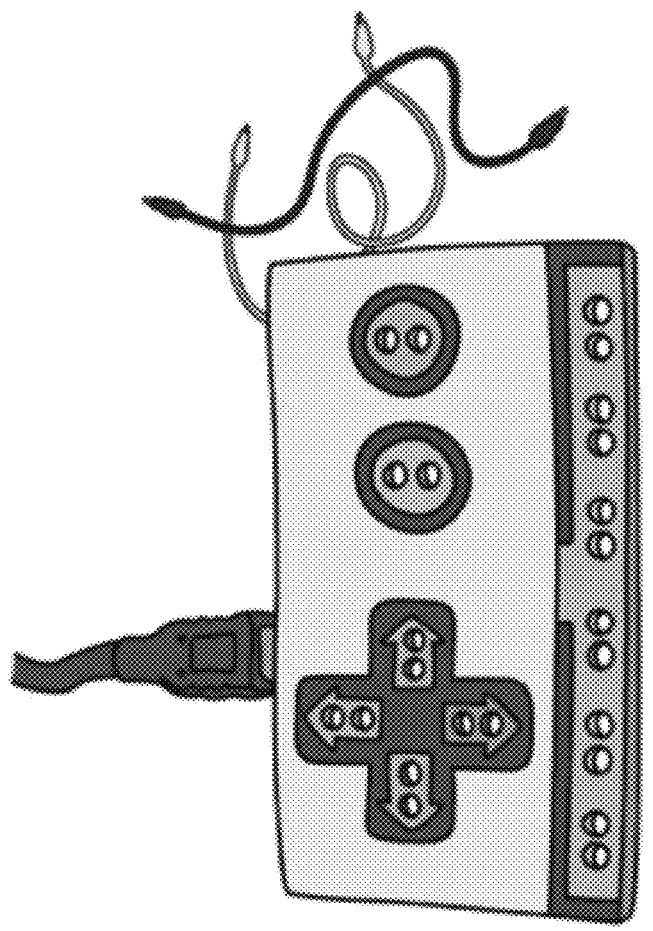

In response to receiving the remap mode message, the web browser 182 advances the remapping GUI 221 to a confirmation screen 230 of FIG. 5C. The confirmation screen 230 instructs the user to disconnect the alligator clips. When the adaptive interface device 100 detects that the alligator clips are disconnected, the adaptive interface device 100 sends current mapping data to the web browser 182 (step 232). For example, the current mapping data may include a fifty-seven character configuration string to the web browser 182 that identifies the current programed mapping of the adaptive interface device 100 (i.e., the key mapping 180), such as "suph50h52h51h4fh2 chf0h1ah04h16h07h09h0ahf4hf5hf2hf3hf0hf1," plus three additional characters (e.g., "h50") indicating the position that the user is located at within the navigable data structure 174.

Figure 5D:
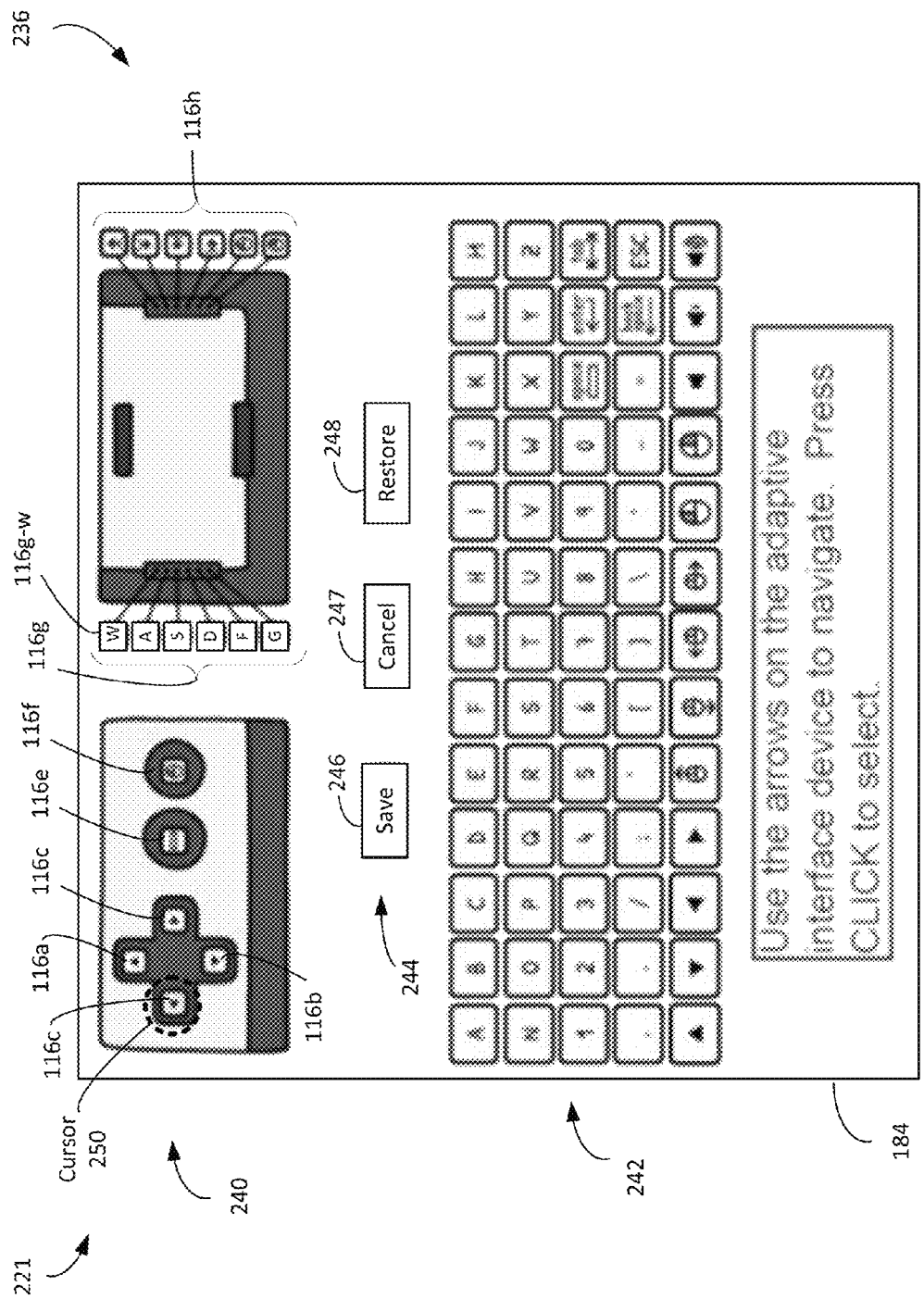

After receipt of the current mapping data, the web browser 182 advances the remapping GUI 221 to a remapping screen 236, as illustrated on FIG. 5D (in step 234). The remapping screen 236 includes display of a graphical representation of the navigable data structure 174. The graphical representation of the navigable data structure 174 includes a graphic representation of the adaptive interface device 100 and its input pins 116 (virtual adaptive interface 240), an onscreen keyboard (OSK) 242 (also referred to as a virtual keyboard 242), and virtual programming control buttons 244.

The virtual adaptive interface 240 that is shown is based on the version information transmitted as part of the remap mode message in step 228. In other words, the particular shape, layout, and programmable inputs illustrated are based on the version information. Additionally, the virtual adaptive interface 240 is shown with the current mapping of the input pins 116 provided with the current mapping data in step 232. Accordingly, the virtual adaptive interface 240 is a visual representation of the front and back sides of the adaptive interface device 100 with current mappings for each of the input pins 116.

The virtual programming control buttons 244 include a row having a save button 246, a cancel button 247, and a restore button 248, which are described in further detail below.

Navigation of the remapping screen 236 is performed by way of user inputs on the adaptive interface device 100, which are interpreted and conveyed as navigation codes over the one-way communication to the local computer 154. The user may navigate the remapping screen 236 by causing actuation of (triggering) the up arrow input pin 116*a*, down arrow input pin 116*b*, left arrow input pin 116*c*, and right arrow input pin 116*d*, and the click input pin 116*f* on the adaptive interface device 100. As noted, navigating the remapping screen 236 through triggering these input pins 116 visualizes the actual navigation of data structure 174 on the adaptive interface device 100 that is occurring through the same triggering. Triggering one of these input pins 116 generates a navigation control code that is sent to the web browser 182 over the connector cable 104. The navigation control code is a three character hex code starting with an "x" value. More specifically, the navigation controls codes are set forth in TABLE I as follows:

TABLE I

Navigation Control Codes (X_ _)

| Up | X52 | Right | X4F |
|---|---|---|---|
| Down | X51 | Click | XF0 |
| Left | X50 | | |

Navigation of the remapping screen 236, including the virtual adaptive interface 240, virtual keyboard 242, and virtual programming control buttons 244, is linear. A cursor 250 is provided on the remapping screen 236. The cursor 250 may be a contrasting color, flashing element, or, as illustrated, a circle, that highlights a current position of the user within the navigable data structure 174.

The adaptive interface device 100 receives various navigation inputs from the user triggering input pins 116 and, in response to each navigation input, the adaptive interface device 100 outputs a navigation code to the web browser 182 of the local computer 154 (step 252). The web browser 182, in turn, updates the remapping screen 236 in accordance with the received navigation codes (step 254). The updates are, for instance, changing the location of the cursor 250 on the remapping screen 236. After updating the remapping screen 236 based on navigation codes, the web browser 182 determines whether the most recent navigation code indicates that the adaptive interface device 100 has been remapped (e.g., the save button 246 has been selected). If the adaptive interface device 100 has not been remapped, the method 200 returns to step 252. Steps 252 and 254 may be repeated as a user navigates the navigable data structure 174 and step 256 continues to be evaluated to be false.

For example, when the cursor 250 is on the virtual adaptive interface 240, the right arrow navigation codes cause the cursor 250 to proceed through the input pins 116 in the following order: left arrow, up arrow, down arrow, right arrow, space, click, W, A, S, D, F, G, mouse up, mouse down, mouse left, mouse right, mouse left click, mouse right click, and then, looping back, the left arrow again.

Triggering the down arrow input pin 114*b* on the adaptive interface device 100 will drop the cursor off of the virtual adaptive interface 240 and to the virtual programming control buttons 244, where the user can select the save button 246, cancel button 247, or restore button 248. Triggering the up arrow input pin 114*a* on the adaptive interface device 100 brings the cursor 250 back up to the virtual adaptive interface 240.

Figure 5E:
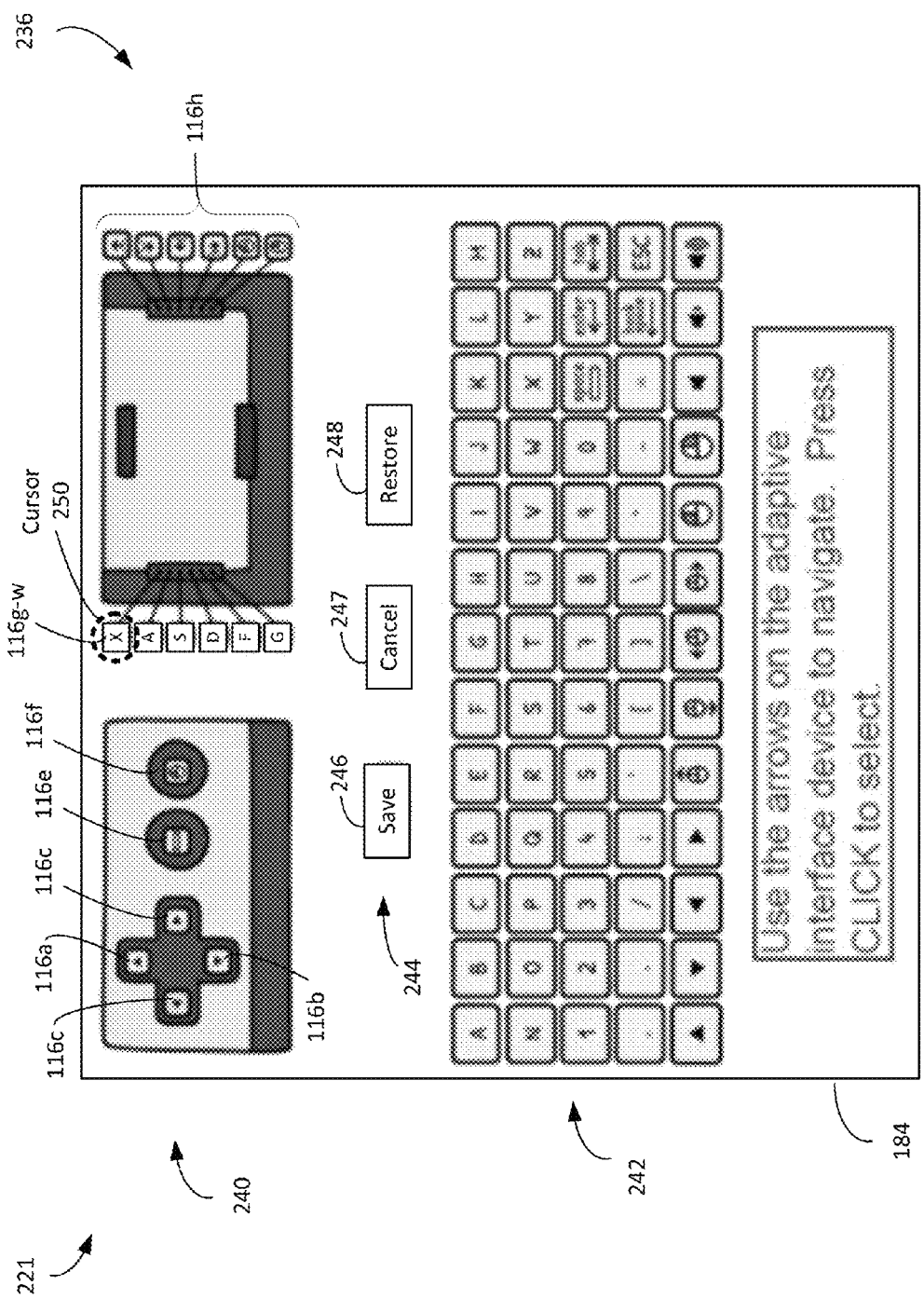

Navigation to the virtual keyboard 242 is performed by triggering the click input pin 116*f* on the adaptive interface device 100 when the cursor 250 is on one of the (virtual) input pins 116 of the virtual adaptive interface 240. Selecting one of the (virtual) input pins 116 and navigating to the virtual keyboard 242 allows the user to modify the key/control assigned to the selected one of the input pins 116 of the adaptive interface device 100. Upon triggering the click input pin 116*f* when the cursor 250 is on one of the virtual input pins 116, the cursor 250 jumps to the location of the currently assigned key on the virtual keyboard 242. The user can then navigate to a new key on the virtual keyboard 242 by triggering the arrow input pins 114*a-d* on the adaptive interface device 100 to control the cursor 250 on the virtual keyboard 242. By triggering the click input pin 116*f* again, the cursor 250 returns to the virtual input pin 116 on the virtual adaptive interface 240. The selected virtual input pin 116 is also graphically changed to the new key previously highlighted on the virtual keyboard 242 when the click input pin 116*f* was triggered. For example, FIG. 5E illustrates the remapping screen 236 after the input pin 116*g-w* on the virtual adaptive interface 240 is updated from a "W" to an "X" character.

While the virtual adaptive interface 240 now has a modified key mapping, the actual key mapping 180 of the adaptive interface device 100 is not yet updated. Rather, to update the key mapping 180 with the modified key mapping displayed on the virtual interface device 240, a user positions the cursor 250 on the save button 246 and triggers the click input pin 116*f*. Upon triggering the click input pin 116*f* when the cursor 250 is positioned on the save button 246, the adaptive interface device 100 is remapped. This remapping is detected in step 256 by the web browser 182 based on the navigation inputs, including the triggering of the click input pin 116*f* when the cursor 250 was positioned on the save button 246.

In response to detecting the remapping, the web browser 182 displays the updated key mapping 180 of the adaptive interface device 100 on the virtual adaptive interface 240. In some instances, the virtual adaptive interface 240 will already be showing the updated key mapping upon selection of the save button 246 and, in step 258, the virtual interface device 240 is unchanged. In some instances, in step 258, an additional visual indicator (e.g., flash, color change, or particular text) is shown on the remapping screen 236 to indicate that the mapping has been updated.

In step 260, the web browser 182 determines whether additional navigation input is received. If additional navigation codes are received by the web browser 182, the method returns to step 254 to update the remapping screen 236. If no additional navigation codes are received, e.g., for a predetermined amount of time, the method 200 ends. The method 200 may also be exited through selection of the cancel button 247.

An example of reprogramming the input pin 116*g-w* using the method 200 is now provided. To reprogram the input pin 116*g-w* of the adaptive interface device 100 to output an "X" value instead of a "W," the user can take the following steps:

i. navigate the cursor 250 to the "W" (input pin 116*g-w*) of the virtual adaptive interface 240 and trigger the click input pin 116*f* on the adaptive interface device 100, causing the cursor 250 to jump down to the "W" on the virtual keyboard 242;

ii. position the cursor on the "X" of the virtual keyboard 242 by actuating the right arrow input pin 116d once on the actual adaptive interface device 100;

iii. trigger the click input pin 116f, causing the cursor 250 to return to the input pin 116g-w on the virtual adaptive interface 240, which is then graphically changed from having a "W" to an "X" (see FIG. 5E);

iv. trigger the down arrow input pin 116b on the adaptive interface device to move the cursor 250 to the save button 246;

v. trigger the click input pin 116f to save the new mapping on the adaptive interface device As noted previously, selecting the save button 246 does not cause the updated mapping to be sent from the computer 154 to the adaptive interface device 100. Rather, the various navigation inputs provide by the user in the steps i., ii., and iii. to the adaptive interface device 100 are received by the reprogramming code 170 and, when the save button 246 is selected in step v., the reprogramming code 170 updates the key mapping 180 according to the received user inputs.

The cancel button 247, when selected by the user, is used to cause the adaptive interface device 100 to exit the remapping mode and return to the normal operating mode. Upon returning to the normal operating mode, the key mapping 180 will have the values assigned in the most recent save operation.

The restore button 248, when selected by the user, is used to cause the adaptive interface device 100 to return to default settings. Upon selecting the restore button 248, the key mapping 180 is overwritten with default key assignments.

Returning to FIG. 4B, the method 210 for programming of the adaptive interface device 100 is illustrated. The method 210 begins with the adaptive interface device 100 receiving inputs that cause entry into the remapping mode (step 270). More particularly, as described above with respect to FIG. 5B, a user may connect particular input pins 116 together and then connect the adaptive interface device 100 to the local computer 154 via the connector cable 104 to provide power thereto. Upon providing power to the adaptive interface device 100, the particular connections are detected by the microcontroller 106, and the adaptive interface device 100 enters into the remapping mode.

After the adaptive interface device 100 enters the remapping mode, the adaptive interface device 100 transmits the remap mode message to the local computer 154 (step 272). The remap mode message is transmitted in step 272 as it was described with respect to step 228 of FIG. 4A. In step 274, upon detecting that the particular connections of the input pins 116 used to enter the remapping mode have been broken, the adaptive interface device 100 transmits the current mapping data to the local computer 154, as it was described above with respect to step 232 of FIG. 4A.

In step 276, the adaptive interface device 100 receives navigation input at the input pins 116. In other words, the user triggers various input pins 116 by selectively connecting the input pins 116 to ground. Based on the receiving navigation inputs, in step 278, the navigable data structure 178 is navigated and the adaptive interface device 100 is remapped. For instance, the navigation inputs cause the navigation of navigable data structure 174, which leads the reprogramming code 170 to update the key mapping 180, as described in greater detail above.

In step 280, the adaptive interface device 100 transmits navigation codes to the web browser 182 of the local computer 154 indicative of the navigation input received. In turn, the web browser 182 updates the remapping screen 236 (see FIG. 5D). In practice, the steps 276, 278, and 280 are repeatedly cycled between and overlap in execution during the process of remapping the programmable inputs of the adaptive interface device 100. Particularly, for each navigation input received in step 276, a navigation code is transmitted in step 280, and the transmissions of step 280 occur in real time as navigation inputs are received in step 276. This overlapping execution of steps 276, 278, and 280 contrasts with sequentially carrying out step 276, 278, and then step 280 by waiting for step 276 to be complete before proceeding to step 278 and waiting for step 278 to be complete before proceeding to step 280. The navigation codes transmitted in step 280 are used to update the remapping screen 236 as described above with respect to method 200 of FIG. 4A. In step 282, if further navigation input is received by the adaptive interface device 100, the method returns to step 278. If no additional navigation codes are received in step 282, e.g., for a predetermined amount of time, the method 210 ends. The method 210 may also be exited through selection of the cancel button 247.

The adaptive interface device 100 and the remapping screen 236 of the web browser 182 are semi-independent state machines. The state of the remapping screen 236 is controlled by the adaptive interface device 100, but the adaptive interface device 100 is not controlled by the remapping screen 236 and does not receive data from the remapping screen 236 to confirm that the state machines are in synchronization. Therefore, in addition to the navigation control codes (L, R, U, D, Click), the adaptive interface device 100 sends a navigation state code (i.e., the expected location of the cursor 250) with each input pin 116 actuation. Each navigation state code is a three-character hex code as well, but the navigation state codes start with an "h" while the navigation control codes start with an "x." For instance, the up arrow navigation state code is represented by "h52," while the up arrow navigation control code is represented by an "x52." A list of navigation state codes is provided below in Table II.

TABLE II

| Navigation State Codes (H_ _) | | | |
|---|---|---|---|
| Letters: | A (H04) to Z (H1D) | Backspace | H2A |
| Numbers: | 1 (H1E) to 0 (H27) | Esc | H29 |
| Space | H2C | Up | H52 |
| Enter | H28 | Down | H51 |
| Tab | H2B | Left | H50 |
| ' | H36 | Right | H4F |
| . | H37 | Mouse up | HF4 |
| / | H38 | Mouse down | HF5 |
| ; | H33 | Mouse Left | HF2 |
| ` | H34 | Mouse right | HF3 |
| [ | H2F | Mouse left click | HF0 |
| ] | H30 | Mouse right click | HF1 |
| \ | H31 | Volume Mute | H7F |
| ' | H35 | Volume Down | H81 |
| - | H2D | Volume Up | H80 |
| = | H2E | | |

For example, as noted above, when the current mapping data is provided to the web browser 182 in step 232, three additional characters (e.g., "h50") indicating the current position within the navigable data structure 174 (i.e., the location of the cursor 250). Accordingly, the cursor 250 starts at the left arrow on the virtual adaptive interface 240 based on the coding of TABLE II above. When the user presses the right arrow (input pin 116d) on adaptive interface device 100, the string "x4fh52" is sent as the navigation code, which includes the navigation control code "x4f" and the navigation state code "h52." This navigation code indicates to the web browser 182 that (1) the cursor 250 is to be shifted to the right one increment based on the navigation control code "x4f" and (2) that the expected location of the cursor 250 after the shift is the up arrow based on the navigation state code "h52." Pressing the right arrow again causes the adaptive interface device to output the string "x4fh51" as the navigation code, which indicates to advance the cursor 250 one increment right ("x4f") and confirms that the cursor 250 will then be located at the down arrow ("h51").

Since the communication between the adaptive interface device 100 and the local computer 154 is one way and the web browser 182 does not communicate back to the adaptive interface device 100, user navigations of the remapping screen 236 through an input device other than the adaptive interface device 100 would remain unknown to the adaptive interface device 100. Accordingly, the remapping GUI 221 and web browser 182 is set such that computer inputs via other typical peripherals (e.g., keyboard or mouse) do not effect or navigate the remapping screen 236. This technique assists in allowing the remapping screen 236 to stay synchronized with the internal state of the adaptive interface device 100.

To ensure that the user cannot use a standard keyboard or mouse to navigate the remapping screen 236, the navigation control codes that the adaptive interface device 100 outputs are non-standard hex strings, instead of the standard HID equivalent. For instance, while in a normal operation mode, the user may trigger the right arrow input pin 116d on the adaptive interface device 100 to output an HID equivalent that navigates right on the display 184 of the local computer 154, when in remapping mode, the right arrow on the adaptive interface device 100 actually outputs "x4f" (along with the three character hex code representing the expected state), which are not standard HID codes. Thus, if the user pressed the right arrow on a keyboard connected to the local computer 154, the remapping screen 236 would not recognize the input.

If the local computer 154 fails to receive a user input for a predetermined amount of time while in the remapping mode, the web browser will display a time out message. The time out message may indicate that communication has timed out and request that the user refresh the page to start over (e.g., at the screen 222 of FIG. 5A). The adaptive interface device 100 may also be setup to exit the remapping mode if it fails to receive a user input for the predetermined amount of time while in the remapping mode. If such an automatic exit occurs because of a time out period being reached, the adaptive interface device 100 may resort back to default programming of its input pins 116, or may resort back to the most recently saved programming of its input pins 116.

The embodiments of the adaptive interface device 100 described above are examples of devices that are reprogrammable using the above-noted techniques. In some embodiments, the reprogramming techniques are used to reprogram, for example, other programmable computer interface devices and/or other programmable devices that do not generally serve as a computer interface device. For example, a programmable device that is not generally a computer interface device may include a PCB with a microcontroller mounted thereon and various inputs and outputs (e.g., pins, LEDs, sensors, vibration generators, and/or speakers) usable for various functions that, during typical operation, are independent of interfacing with a computer. In a reprogramming mode, however, the programmable device is coupled to a computer, e.g., using a USB cable, and the computer then provides real time visual feedback of the user's reprogramming based on one-way communication using similar techniques as described above. For instance, the reprogramming may be used to alter settings of the microcontroller, alter input or output parameters, remap inputs and/or outputs to be assigned to different values or functions, restore default settings, or customize other programmable aspects of the device.

Thus, the invention provides, among other things, an adaptive interface device that is programmable and a system and method of programming an adaptive interface device. Various features and advantages of the invention are set forth in the following claims.

What is claimed is:

1. A method of programming an adaptive interface device, the method comprising:
providing a remapping graphical user interface on a display screen of a computing device;
providing, on the remapping graphical user interface, a graphical representation of a navigable data structure of the adaptive interface device;
receiving, from the adaptive interface device, navigation codes;
updating the graphical representation based on the navigation codes thereby providing visual feedback to a user of the adaptive interface device during programming of the adaptive interface device;
determining, based on the navigation codes, that the adaptive interface device has been remapped to have an updated mapping; and
displaying, on the remapping graphical user interface, the updated mapping of the adaptive interface device.

2. The method of claim 1, further comprising:
receiving, by the computing device, a data cable coupled to the adaptive interface device, wherein the navigation codes are received over the data cable; and
providing, by the computing device, power to the adaptive interface device via the data cable.

3. The method of claim 1, further comprising:
receiving, a remap mode message from the adaptive interface device, the remap mode message indicating that the adaptive interface device has entered a remap mode.

4. The method of claim 1, further comprising:
receiving, from the adaptive interface device, current mapping data; and
displaying, on the remapping graphical user interface, a current mapping of the adaptive interface device based on the current mapping data.

5. The method of claim 1, further comprising:
displaying, on the remapping graphical user interface, a virtual adaptive interface device including virtual programmable inputs, wherein the virtual adaptive interface device is a graphical representation of the adaptive interface device and the virtual programmable inputs are a graphical representation of programmable inputs of the adaptive interface device.

6. The method of claim 5, wherein displaying the updated mapping of the adaptive interface device includes displaying the updated mapping on the virtual adaptive interface device.

7. The method of claim 1, wherein the graphical representation of the navigable data structure is a virtual keyboard.

8. The method of claim 1, wherein updating the graphical representation based on the navigation codes includes changing a location of a cursor on the graphical representation based on the navigation codes, wherein the cursor indicates a current position within the navigable data structure.

9. The method of claim 1, wherein receiving the navigation codes includes receiving, from the adaptive interface device, navigation codes provided over a one-way communication link from the adaptive interface device to the computing device.

10. A method of programming an adaptive interface device, the method comprising:
   transmitting, by the adaptive interface device, a remap mode message to a computing device, the remap mode message indicating that the adaptive interface device has entered a remap mode;
   receiving, by the adaptive interface device, navigation input that navigates a navigable data structure of the adaptive interface device used to remap programmable inputs of the adaptive interface device;
   remapping, by the adaptive interface device, the programmable inputs based on the navigation input; and
   transmitting, by the adaptive interface device, navigation codes indicative of the navigation input received and indicative of the remapping, wherein the navigation codes are transmitted to the computing device, which is configured to provide visual feedback to a user of the adaptive interface device during programming of the adaptive interface device based on the navigation codes.

11. The method of claim 10, further comprising:
   receiving, by the adaptive interface device, a data cable coupled to the computing device, wherein the navigation codes are transmitted over the data cable; and
   receiving, by the adaptive interface device, power from the computing device via the data cable.

12. The method of claim 10, further comprising:
   upon entering the remap mode, transmitting current mapping data to the computing device, the current mapping data indicative of a current mapping of the programmable inputs of the adaptive interface device.

13. The method of claim 10, further comprising:
   before receiving a request, via the programmable inputs, to enter the adaptive interface device into the remap mode, receiving user input at a first programmable input of the programmable inputs;
   transmitting, by the adaptive interface device, a first code to the computing device representing a first mapped output in response to the user input;
   receiving further user input at the first programmable input after the remapping; and
   transmitting, by the adaptive interface device, a second code to the computing device representing a second mapped output in response to the further user input.

14. An adaptive interface device that is programmable, the adaptive interface device comprising:
   programmable inputs;
   an input/output interface configured to be coupled to a computing device;
   a memory including a navigable data structure and a key mapping index; and
   a processor configured to
      transmit a remap mode message via the input/output interface to the computing device, the remap mode message indicating that the adaptive interface device has entered a remap mode;
      receive, via the programmable inputs, navigation input that navigates the navigable data structure;
      remap the programmable inputs based on the navigation input; and
      transmit, via the input/output interface to the computing device, navigation codes indicative of the navigation input received and indicative of the remapping, wherein the navigation codes are transmitted to the computing device, which is configured to provide visual feedback to a user of the adaptive interface device during programming of the adaptive interface device based on the navigation codes.

15. The programmable adaptive interface device of claim 14, further comprising:
   a data cable coupled to the input/output interface and the computing device to form a communication link.

16. The programmable adaptive interface device of claim 14, wherein the key mapping index relates each of the programmable inputs to a corresponding output code.

17. The programmable adaptive interface device of claim 14, wherein, upon entering the remap mode, the key mapping index has current mapping data indicative of a current mapping of the programmable inputs of the adaptive interface device.

18. The programmable adaptive interface device of claim 14, wherein upon completion of the remapping, the key mapping index has updated mapping data indicative of an updated mapping of the programmable inputs of the adaptive interface device.

19. The programmable adaptive interface device of claim 14, wherein the processor is further configured to,
   receive user input at a first programmable input of the programmable inputs;
   transmit a first code to the computing device representing a first mapped output in response to the user input;
   receive further user input via the first programmable input after the remapping; and
   transmit a second code to the computing device representing a second mapped output in response to the further user input.

20. The programmable adaptive interface device of claim 14, further comprising:
   a conductor selectively secured to two of the programmable inputs to form a conductive path between the two programmable inputs, and wherein
   the processor is further configured to detect the conductive path formed by the conductor and, in response, enter the adaptive interface device into the remap mode.

* * * * *